ll USOO6054162A

United States Patent [19]
Bradbury et al.

[11] Patent Number: 6,054,162
[45] Date of Patent: Apr. 25, 2000

[54] STABILIZATION OF LIQUID COFFEE BY TREATMENT WITH ALKALI

[75] Inventors: Allan G. W. Bradbury, Oyten; Hartmut H. Balzer, Langwedel; Otto G. Vitzthum, Bremen, all of Germany

[73] Assignee: Kraft Foods, Inc., Northfield, Ill.

[21] Appl. No.: 08/795,855

[22] Filed: Feb. 5, 1997

[51] Int. Cl.[7] .......................................................... A23F 5/00
[52] U.S. Cl. .......................... 426/330.3; 426/594; 426/442
[58] Field of Search ................................ 426/330.3, 594, 426/442

[56] References Cited

PUBLICATIONS

Japanese Abstracts, ABS GRP No. C437, vol. 11, No. 232 . for Appl. 60–182976 filed Aug. 22, 1985. Inventors: Matsuyama et al.

Maier, H.G. et al., Säuren des Kaffees, Deutsch Lebensmittel–Rundschau, 80 (9), & pp. 265–268 (1984.).

Maier, H.G., "The Acids of Coffee", ASIC, 12th Colloque Montreux, pp. 229–237 (1987).

Scholz, B.M. and Maier, H.G., "Isomers of Quinic Acid and Quinide in Roasted Coffee", Zeitschrift für Lebensmittel–Untersuchung und–Forschung, 190, pp. 132–134 (1990).

*Primary Examiner*—Anthony J. Weier
*Attorney, Agent, or Firm*—Thomas A. Marcoux; Thomas R. Savoie

[57] ABSTRACT

The present invention is directed to a liquid coffee in which the development of acidity has been inhibited and which results in a longer shelf-stable product. The method used in making the liquid coffee product of the present invention includes treating the coffee extract with an alkali, the alkali being present in an amount effective to convert acid precursors present in the coffee extract to their respective acid salts, and thereafter neutralizing the treated coffee extract with an acid, the acid being present in an amount effective to neutralize any excess alkali from the first step and to adjust the final pH of the liquid coffee product to the desired value.

22 Claims, No Drawings

STABILIZATION OF LIQUID COFFEE BY TREATMENT WITH ALKALI

BACKGROUND OF THE INVENTION

1. Field of the Invention

The present invention is generally related to the field of coffee, and more particularly to the making of an improved liquid coffee. More specifically, the present invention is directed to a technique of stabilizing a liquid coffee product by inhibiting the development of acidity which occurs on storage. This is accomplished by treating the coffee extract with an alkali and thereafter neutralizing the solution to the desired pH. The alkali treatment hydrolyzes the lactones and esters which are present in solubilized coffee solids and converts them into stable salts. The lactones and esters are the acid precursors which are responsible for the increase in acidity of stored liquid coffee products.

2. Description of the Prior Art

The acidic nature of coffee and the role it plays in the ultimate quality of a coffee beverage is well documented. Although the acid fraction of a coffee extract generally constitutes from only about 10 to about 15% of the solids in the extract, the effect that acids have on the final coffee product can be said to be a determining factor in the consumer appeal of a coffee beverage. More particularly, too much acidity in a coffee can result in an undesirable sourness to the beverage, while too little acidity in the coffee causes a "flat" flavor profile. Finding and maintaining the right acidic balance is critical.

The task of adjusting the acidity of a coffee beverage is not made any easier by the fact that well over 25 different acids have been identified in roasted coffee. More particularly, about 8% of green coffee is comprised of numerous isomers of caffeoylquinic acids, also referred to as chlorogenic acids. Other principal acids found in green coffee include malic and citric acids. Roasted coffee produces additional acids, such as acetic, formic, glycolic, lactic and pyroglutamic acids.

Various factors are known which affect the acidity of a coffee extract. For example, different bean varieties result in varying acidity. The pH of a coffee brewed from Arabica varieties is generally found to be between 4.85 and 5.15. In contrast, coffee brewed with Robusta beans generally have a pH in the range of 5.25 to 5.40. Other factors which are said to influence the degree of acidity include the degree of roast, the type of roaster, the nature of the processing and the age of the green beans.

Liquid coffee products, although not widespread in the United States, represent a significant part of the Japanese and Korean coffee markets. The product is usually pre-sweetened and ready to drink. The liquid coffee product is generally prepared by mixing a diluted coffee extract with the desired additives, such as milk, sugar and flavorants. The product is then packaged in a suitable container, such as a can, which can be subjected to retort processing. The result is a liquid coffee product which can be distributed to the consumer. The product can be stored for generally up to six months at room temperature before consumption.

Unfortunately, a major problem exists with the marketing of liquid coffee. More particularly, coffee extract is an unstable system and both the shelf- and refrigerator-stored liquid coffee products currently available develop an increased acidity over a short period of time. Too low of a pH also results in the possible curdling of the milk or cream. Simply, the rise in acidity translates into a loss of quality to the product. That is, there is an increased sourness to the liquid coffee product. This quality loss is known as "staling" and although the cause of staling is attributed for the most part to the drop in pH and the increase in titratable acidity, no clear explanation or mechanism is known for its occurrence.

H. G. Maier, et al., *Dtsch. Lebensmittel-Rdsch.* 80(9): 265–268 (1984) have shown that the content of low molecular weight acids increase on storage at elevated temperatures and attributed the increase to the hydrolysis of esters and lactones produced on roasting.

One solution which has been used to prevent the problem of sourness development is the addition of sodium bicarbonate to elevate the initial pH of the product. However, the product pH of the sodium bicarbonate-treated liquid coffee product still falls on storage and has additional potential repercussions on product flavor.

Consequently, there is still a need for a process that prevents the accumulation of acidity in stored coffee extracts.

SUMMARY OF THE INVENTION

The process of the present invention was developed to find a solution to the staling of liquid coffee extracts. The fact that there is a concomitant increase in titratable acidity in stored coffee extracts is indicative of acid being generated during storage. This in turn points to the presence of a significant quantity of acid precursors in fresh coffee extracts. By the use of the treatment described herein, liquid coffee can be stored without deterioration of quality.

Specifically, the present invention is directed to a method for stabilizing a coffee extract comprising the steps of treating the coffee extract with an alkali, said alkali being present in an amount effective to convert acid precursors present in the coffee extract to their respective acid salts, and neutralizing the treated coffee extract with an acid, said acid being present in an amount effective to neutralize any excess alkali and obtain a final pH of the coffee extract of from about 4.8 to about 5.2.

The stabilization treatment of the present invention offers the opportunity to extend the product shelf-life of liquid coffee products and consequently make them more appealing to the consumer.

The present invention is further directed to an improved liquid coffee product made in accordance with the stabilizing treatment described above. The liquid coffee product made in accordance with the present invention possesses a longer and more stable shelf-life than any known liquid coffee product currently available.

DETAILED DESCRIPTION OF THE INVENTION

The present invention provides a method for inhibiting the development of acidity which occurs during storage of a coffee extract. In order to suppress the acidity increase in stored coffee, it was first necessary to study the changes in the concentrations of organic acids during storage of a coffee brew and to identify the acids which contributed most to the increase in acidity.

As is evidenced by the data obtained in Comparative Example 1, it was found that the major contribution to increased acidity in a stored coffee brew was provided by the production of quinic acid, which increased by almost 40%. Other acids which showed significant increases in concentration were acetic acid (24%), glycolic acid (16%), formic acid (14%) and phosphoric acid (27%). Citric and malic acids showed no significant increase, while the other acids being monitored showed small increases.

Once the major acids were identified which were responsible for the acidity increase in the stored coffee, the next step in the development of the present invention was to understand the reactions which led to the production of these acids. For example, upon roasting, it has been found that both quinic and chlorogenic acids form lactones, i.e. quinic acid lactone and chlorogenic acid lactone. Their formation can be illustrated as follows:

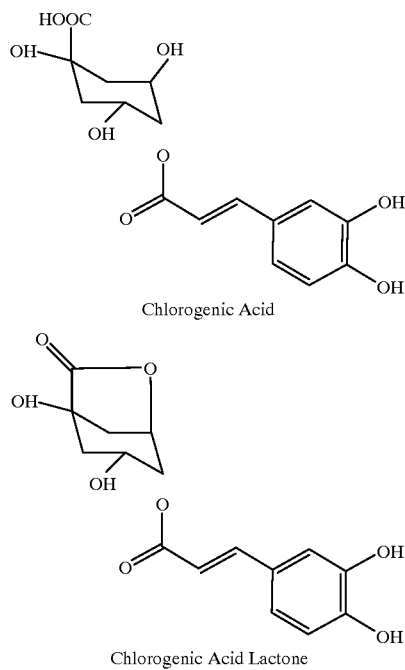

As shown above, the chlorogenic acid present in the coffee degrades on roasting to produce both quinic acid and chlorogenic acid lactone. As is further illustrated, the quinic acid then breaks down to produce quinic acid lactone. The present invention realizes that these lactones represent the primary precursors to the acids which develop upon storage. The gradual hydrolysis of the above-noted lactones are responsible for the development of chlorogenic acid and quinic acid in untreated liquid coffee.

Through the use of gas chromatography and mass spectroscopy, it was determined that in a stored coffee brew (for a period of 8 days at a temperature of 60° C.), the concentration of quinic acid increased by 14.8 mmol/kg while the quinic acid lactone concentration decreased by 12.2 mmol/kg. This translates into a 29.6% increase in acid and a 24.5% decrease in the lactone. The large increase in quinic acid concentration on storage suggests that the hydrolysis of the quinic acid lactone is an important contributor to the acidity development.

Similarly, it was determined that based on the existence of the chlorogenic acid lactones in the stored coffee, the hydrolysis of the lactones to chlorogenic acid represented a 10 to 15% increase in the overall acidity of the coffee on storage.

The other acids which were found to increase over time, such as acetic acid, formic acid, phosphoric acid and glycolic acid, are all low molecular weight acids which are believed to be produced on storage by hydrolysis of precursor esters. It is suggested that these precursor esters could be produced by reaction of acids produced during roasting with hydroxyl groups such as those present in the coffee polysaccharides. On hydrolysis, the acids would then be released. Increases of about 20%, 10%, 7% and 6% were found to occur with acetic acid, formic acid, phosphoric acid and glycolic acid, respectively. Overall, hydrolysis of esters produced on roasting are believed to be ultimately responsible for about 35% of the acidity increase in the stored liquid coffee product. These are percentages of the total acid increase.

In addition to the above, it is further noted that polymeric Maillard-type products known as coffee melanoidins are believed to contribute to the sourness of roast coffee. Based on the fact that coffee melanoidins are acidic and contain a variety of functional groups, it seems likely that they would also contain ester or lactone linkages which would contribute to acidity increase on storage.

Based on the observations described above, the overall acidity increase in a stored coffee extract was found to be due primarily to the formation of acids by hydrolysis of esters and lactones produced on roasting. Based on these findings, a method was developed for inhibiting acid production and thus stabilizing a coffee extract such that staling of the coffee product would not occur.

In the process of the present invention, the first step in stabilizing a coffee extract is the treatment of the coffee extract with an alkali. Alkalies are compounds that contain the hydroxide ion (OH). When the alkali reacts with an ester a saponification reaction occurs which converts the ester group into an acid salt and an alcohol group. Thus, in order to prevent the lactones and esters from forming acids by hydrolysis during storage and increasing the acidity of the beverage, the alkali is reacted with the lactones and esters to produce the stable acid salts. Accordingly, on storage, the lactones and esters are no longer present and cannot form their acid counterparts through hydrolysis.

The amount of alkali to be added to the extract in the process of the present invention must be in a sufficient quantity to convert the acid precursors present in the coffee extract into their respective acid salts. Based on the fact that different varieties of coffee and degrees of coffee roast are comprised of different percentages of acids, the required amount of alkali will vary depending on the coffee blend which is used, as well as other factors which effect the acid composition of the coffee extract. Generally speaking, however, the alkali is added in an amount from about 0.1 mol/l to about 0.5 mol/l. A preferred amount of alkali is from about 0.25 mol/l to about 0.35 mol/l.

Alkalis as defined herein may be any of those typically used in the art and include any food-acceptable alkalis such as sodium hydroxide, calcium hydroxide, potassium hydroxide and the like. Potassium hydroxide is the preferred alkali because potassium is naturally present in coffee and it is less detectable from a flavor perspective.

The treatment of the coffee extract in the first step of the method of the present invention should be conducted at a temperature and pH suitable for the neutralization reaction to take place. The time for the neutralization reaction, i.e. the conversion of the lactones and esters into their respective stable acid salts, will also vary depending on the other variables. More specifically, use of a lower pH is possible at elevated temperatures. For example, the pH of the coffee extract may be raised to a pH of 10 by the addition of N KOH at room temperature for one hour. Alternatively, the pH can be held at 9 if the coffee extract is treated at a temperature of 60° C. for the same time period. Generally, the coffee extract can be treated in the temperature range of 0° C. to 80° C. The higher temperatures allow the use of low pH (as low as 8.5) and short processing times (as short as 1 minute). Lower temperatures would require high pH (as high as 12.0) and longer processing times (as long as 1 day). The adjustment of these variables to ensure the reaction with the alkali are well within the abilities of those skilled in the art.

Because of primarily economic considerations, there are two preferred set of processing conditions to effect alkali treatment of the coffee extract. The first preferred set of conditions will treat the coffee extract at room temperature at from about 20° C. to about 25° C. At these temperatures, the extract should be maintained at a pH of from about 9.5 to about 12 for a time effective to convert acid precursors to their respective acid salts. The preferred time should vary from about 0.75 to about 1.25 hours. The second set of conditions will treat the coffee extract at elevated temperatures of from about 55° C. to about 65° C. At these temperatures, the extract should be maintained at a pH of from about 8.8 to about 9.5 for a time effective to convert acid precursors to their respective acid salts. The preferred time should vary from about 0.75 to about 1.25 hours.

The second step in the method of the present invention is the neutralization of the treated coffee extract resulting from the first step. After the first step has been completed, excess alkali is present and the pH of the extract is too high. By addition of an acid, the excess alkali is neutralized and the pH can be adjusted to the desired value.

Acids which may be used in the present invention may be any of those typically used in the art and include any food-acceptable acid such as various types of phosphoric acid, citric acid, tartaric acid, fumaric acid, adipic acid, malic acid and the like.

Of course, the specific amount of acid to be used, and the type of acid to be used, will depend on the desired qualities of the end product, specifically the desired pH as well as desired flavor. That is, an acid is added to obtain a final pH which results in an optimum sensory quality. Typically, for liquid coffee beverages, a pH of from about 4.7 to about 5.3 is desired, with a pH of about 4.9 to about 5.1 being preferred.

Alternatively, the neutralization reaction of the second step of the present invention may be performed with the use of a cation exchanger in the [$H^+$] form. The specifics of such reactions are well known to those skilled in the art and do not need to be detailed.

The coffee extracts treated by the method of the present invention were found to have a low quinic acid lactone content indicating what the results would eventually show with respect to the storage of the coffee over time. As was expected, the liquid coffee extracts showed no appreciable drop in pH. A few minor changes were detected in the composition of the coffee volatile fraction, however, the product after a storage time equivalent to six months at room temperature had only a slightly reduced flavor intensity as compared to a fresh control sample. Moreover, the preferred process seeks to avoid loss of aromatics by removing aromatics from the extract prior to alkali treatment, as for example by steam distillation and then adding back these aromas after neutralization of the alkali-treated extract. The increased salt level in the treated extract was detected by a few, but not all, tasters on the taste panel.

The liquid coffee product produced by the method of the present invention exhibits a longer and more stable shelf-life than liquid coffee products currently available in the market. Due to the stabilized pH, there is no longer a risk of milk flocculation occurring on storage. As indicated above, the liquid coffee products made in accordance with the present invention are characterized by either the absence of or having a very low level of quinic acid lactone. Generally, liquid coffee products treated by the method of the present invention will have less than 0.05% quinic acid lactone content.

The following examples are provided to further illustrate the present invention.

COMPARATIVE EXAMPLE 1

Based on reaction kinetics which show a strong temperature dependence, it was determined that for acid formation, storage of a coffee extract at a temperature of 25° C. for a period of six months was equivalent to the storage of the same extract for a period of 14 days at a temperature of 60° C.

A standard coffee solution made from Colombian beans at a temperature of 60° C. was stored and monitored over a 14 day period. After about 200 hours, the development of acid had leveled off, with the pH dropping from about 4.9 to about 4.5. The pH drop resulted in an unpleasant sour taste. The resulting data (see Table 1 below) showed an increase of several organic acids.

TABLE 1

Change in organic acids in stored coffee brew

| Acid [g/kg] | Time [hrs] | | | | | |
|---|---|---|---|---|---|---|
| | 0 | 2.5 | 8 | 24 | 72 | 120 |
| Quinic | 7.8 | 8.7 | 8.7 | 9.0 | 9.9 | 10.8 |
| Acetic | 3.15 | 3.6 | 3.6 | 3.6 | 3.9 | 3.9 |
| Glycolic | 1.14 | 1.29 | 1.23 | 1.25 | 1.23 | 1.32 |
| Formic | 2.0 | 2.10 | 2.13 | 2.19 | 2.22 | 2.28 |
| Malic | 2.09 | 2.19 | 2.16 | 2.40 | 2.22 | 2.19 |
| Citric | 6.6 | 6.9 | 6.9 | 6.9 | 6.9 | 6.9 |
| Phosphoric | 1.44 | 1.50 | 1.53 | 1.59 | 1.71 | 1.83 |

EXAMPLE 1

R & G coffee was extracted with hot water to give an 8% liquid coffee solution. The extract was treated with N KOH with stirring so that the pH was maintained at a value of 10 at room temperature for a time of one hour. The solution was then neutralized to a pH of 4.8 using 85% $H_3PO_4$. Storage studies (for a period of 14 days at a temperature of 60° C.) showed no drop in pH.

Although some minor changes occurred in the composition of the coffee volatile fraction, optimization of conditions for the treatment of the coffee extract resulted in a product which had only slightly reduced flavor intensity when compared to a fresh control sample.

EXAMPLE 2

R & G coffee was extracted with hot water to give an 8% liquid coffee solution. The extract was treated with 10N KOH with stirring, and at a temperature of 60° C., so that a pH was held at a value of about 9.0. The treatment was for approximately one hour.

The solution was then neutralized to a pH of 5.0 using 85% $H_3PO_4$. The solution was stored for a period of 14 days at a temperature of 60° C. At the end of the storage period, the product showed no observable drop in pH and had a comparative flavor to a fresh control sample.

EXAMPLE 3

R & G coffee was extracted with hot water to give an 8% liquid coffee solution. The extract was treated with 10N NaOH with stirring so that the pH was held at above pH 12 at room temperature for 1 hour. The solution was then neutralized to a pH of 4.73 using 85% $H_3PO_4$. Following the neutralization step, storage studies showed that the observed drop in pH as was shown in Comparative Example 1 no longer occurred. The solution pH remained stable on storage (60° C., 8 days).

Alkali extract treatment at pH 12 requires higher phosphoric acid addition to effect neutralization as compared to the previous two examples. As a result, this will increase the likelihood of sensory perception of the generated phosphate salt in the treated extract.

The above preferred embodiments and examples are given to illustrate the scope and spirit of the present invention. The embodiments and examples described herein will make apparent, to those skilled in the art, other embodiments and examples. These other embodiments and examples are within the contemplation of the present invention. Therefore, the present invention should be limited only by the appended claims.

What is claimed is:

1. A method for stabilizing a coffee extract comprising the steps of:
   a) treating the coffee extract with an alkali, said alkali being present in an amount effective to convert acid precursors present in the coffee extract to their respective acid salts; and
   b) neutralizing the treated coffee extract of step (a) with an acid, said acid being present in an amount effective to neutralize any excess alkali and obtain a final pH of the coffee extract of from about 4.7 to about 5.3 said steps set forth such that acid product is inhibited and staling does not occur in said coffee extract during storage.

2. The method according to claim 1 wherein said alkali is a food-acceptable alkali.

3. The method according to claim 2 wherein said food-acceptable alkali is potassium hydroxide.

4. The method according to claim 1 wherein the effective amount of said alkali ranges from about 0.1 mol/l to about 0.5 mol/l.

5. The method according to claim 4 wherein the effective amount of said alkali ranges from about 0.25 mol/l to about 0.35 mol/l.

6. The method according to claim 1 wherein said acid precursors are lactones and esters.

7. The method according to claim 6 wherein said lactones are chlorogenic acid lactone and quinic acid lactone.

8. The method according to claim 1 wherein step (a) is conducted at a temperature of from about 20° C. to about 25° C.

9. The method according to claim 8 wherein said extract is maintained at a pH of from about 9.5 to about 12.0 for a time effective to convert said acid precursors to their respective acid salts.

10. The method according to claim 9 wherein said effective time is from about 0.75 to about 1.25 hours.

11. The method according to claim 1 wherein step (a) is conducted at a temperature of from about 55° C. to about 65° C.

12. The method according to claim 11 wherein said extract is maintained at a pH of from about 8.8 to about 9.5 for a time effective to convert said acid precursors to their respective acid salts.

13. The method according to claim 12 wherein said effective time is from about 0.75 to about 1.25 hours.

14. The method according to claim 1 wherein said acid is a food-acceptable acid.

15. The method according to claim 14 wherein said acid is selected from the group consisting of phosphoric acid, citric acid, fumaric acid, malic acid, tartaric acid and adipic acid.

16. The method according to claim 15 wherein said food-acceptable acid is phosphoric acid.

17. The method according to claim 1 wherein said final pH is from about 4.8 to about 5.2.

18. The method according to claim 17 wherein the pH ranges from about 4.9 to about 5.1.

19. The method according to claim 1 wherein step (b) comprises neutralizing the treated coffee extract of step (a) with the use of a cation exchanger in the [$H^+$] form.

20. The method according to claim 1 further comprising removing aromatics from the extract prior to step (a) and adding back said aromatics to the treated extract after step (b).

21. A liquid coffee composition made in accordance with the method of claim 1.

22. The liquid coffee composition of claim 21 wherein said composition comprises less than 0.05% quinic acid lactone.

* * * * *